US007003003B2

(12) United States Patent
Mueller et al.

(10) Patent No.: US 7,003,003 B2
(45) Date of Patent: Feb. 21, 2006

(54) METHOD AND APPARATUS FOR PROVIDING MULTIPLE INDEPENDENTLY CONTROLLABLE BEAMS FROM A SINGLE LASER OUTPUT BEAM

(75) Inventors: Eric R. Mueller, West Suffield, CT (US); Ronald Straayer, South Windsor, CT (US)

(73) Assignee: Coherent, Inc., Santa Clara, CA (US)

( * ) Notice: Subject to any disclaimer, the term of this patent is extended or adjusted under 35 U.S.C. 154(b) by 352 days.

(21) Appl. No.: 10/624,768

(22) Filed: Jul. 21, 2003

(65) Prior Publication Data

US 2005/0018716 A1 Jan. 27, 2005

(51) Int. Cl.
*H01S 3/117* (2006.01)
(52) U.S. Cl. .......................... 372/13; 372/9
(58) Field of Classification Search .............. 372/13, 372/9, 23, 69, 71; 398/202, 212
See application file for complete search history.

(56) References Cited

U.S. PATENT DOCUMENTS

| | | | | |
|---|---|---|---|---|
| 3,727,062 A | * | 4/1973 | Foster | 398/87 |
| 3,744,039 A | * | 7/1973 | Hrbek et al. | 365/120 |
| 3,935,566 A | * | 1/1976 | Snopko | 365/123 |
| 4,000,493 A | * | 12/1976 | Spaulding et al. | 347/255 |
| 4,321,564 A | * | 3/1982 | Tregay | 359/320 |
| 4,371,964 A | * | 2/1983 | Podmaniczky et al. | 372/9 |
| 5,450,223 A | * | 9/1995 | Wagner et al. | 398/121 |
| 6,031,852 A | * | 2/2000 | Thompson et al. | 372/20 |
| 2002/0085085 A1 | | 7/2002 | Fischer et al. | 347/239 |

FOREIGN PATENT DOCUMENTS

JP 54-128359 4/1979

OTHER PUBLICATIONS

D.C. Thompson et al., "Acousto-Optically Tuned Isotopic $CO_2$ Lasers for Long-Range Differential Absorption LIDAR," *Proceedings of the SPIE—The International Society for Optical Engineering*, vol. 3383, Apr. 1998, pp. 33-44.

* cited by examiner

*Primary Examiner*—Minsun Oh Harvey
*Assistant Examiner*—Tuan N. Nguyen
(74) *Attorney, Agent, or Firm*—Stallman & Pollock LLP

(57) ABSTRACT

A laser output beam is directed into an acousto-optic cell. The acousto-optic cell is driven by RF voltages at a plurality of different frequencies. Portions of the laser output beam are diffracted by the acousto-optic cell at a plurality of different angles corresponding the different drive frequencies. The different portions of the output beam define a plurality of secondary beams. The magnitude of the RF voltages applied to the acousto-optic cell and the power in the laser output beam may be cooperatively varied to provide a predetermined power in each of the secondary beams.

15 Claims, 1 Drawing Sheet

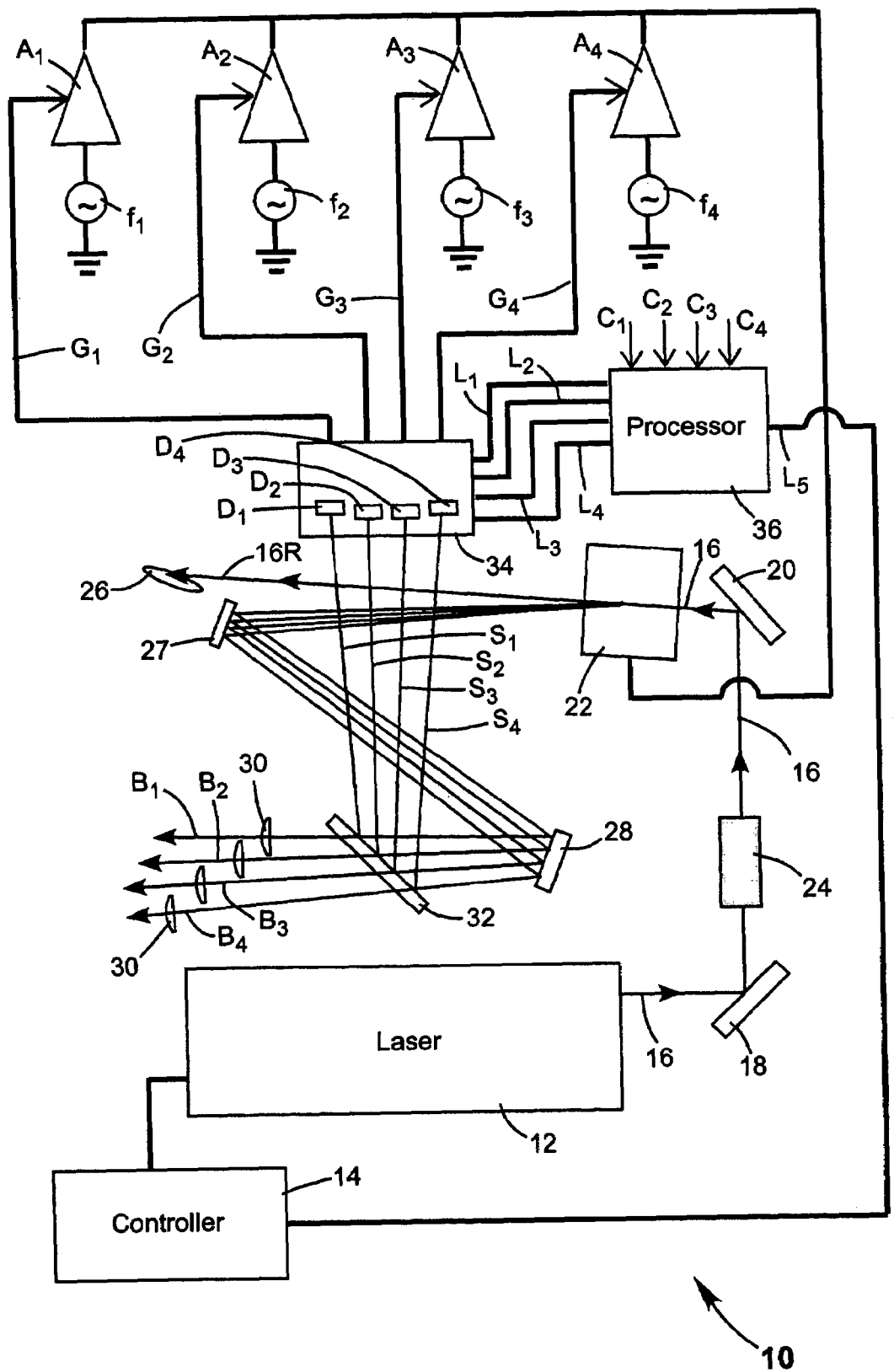

METHOD AND APPARATUS FOR PROVIDING MULTIPLE INDEPENDENTLY CONTROLLABLE BEAMS FROM A SINGLE LASER OUTPUT BEAM

TECHNICAL FIELD OF THE INVENTION

The present invention relates generally to dividing a single laser output beam into a plurality of beams. The invention relates in particular to dividing a laser beam into a plurality of beams using an acousto-optic cell.

DISCUSSION OF BACKGROUND ART

Laser applications often require a work piece to be irradiated simultaneously with two or more individually controlled laser beams. Prior art methods of providing such a plurality of individually controlled laser beams have involved the use of arrays of beamsplitters including polarization-sensitive beamsplitters and polarization rotators. Using such beam splitter arrays together with separate modulators or controllers, while less costly than using a separate lasers for each required laser beam, may still prove prohibitively expensive, depending on a particular application. There is a need for a simple method and apparatus for dividing a laser output beam and separately controlling the divided components of the laser output beam.

SUMMARY OF THE INVENTION

In one aspect of the present invention, a method of providing a plurality of secondary beams from a single laser output beam comprises directing the laser output beam into an acousto-optic cell. A corresponding plurality of RF voltages at a corresponding plurality of different frequencies is applied to the acousto-optic cell. This causes a portion of the laser output beam to be diffracted by the acousto-optic cell at a corresponding plurality of different angles to the laser output beam, thereby providing the plurality of secondary beams.

In a preferred embodiment of the inventive beam dividing method, the magnitude of the RF voltages applied to the acousto-optic cell and the power in the laser output beam are cooperatively varied to provide a predetermined power in each of the secondary beams.

BRIEF DESCRIPTION OF THE DRAWING

The accompanying drawing, which is incorporated in and constitutes a part of the specification, schematically illustrates a preferred embodiment of the present invention, and together with the general description given above and the detailed description of the preferred embodiment given below, serve to explain the principles of the present invention.

THE FIGURE schematically illustrates a preferred embodiment of beam dividing apparatus in accordance with the present invention

DETAILED DESCRIPTION OF THE INVENTION

Referring now to The FIGURE, a preferred embodiment 10 of beam dividing apparatus in accordance with the present invention embodiment is shown. The FIGURE schematically depicts laser beam paths and connections between electronic and electrical components. Beam paths are depicted by fine lines, and electrical connections are depicted by bold lines.

Apparatus 10 includes a laser 12. In one preferred embodiment, laser 12 is a carbon dioxide laser $CO_2$ laser including an RF power supply (not shown). A $CO_2$ laser can provide an output beam having a wavelength between about 9 and 11 micrometers ($\mu$m). A controller 14 controls the output power of the laser and commands the RF power supply to operate the laser in a selected mode such as continuous wave (CW) or pulsed mode. Laser 12 delivers an output beam 16. Beam 16 is directed by turning mirrors 18 and 20 into an acousto-optic cell 22. One preferred acousto-optic cell is a model LS600 Acousto-optic (AO) cell available from Isomet Corporation of Springfield, Va. This AO cell has a bandwidth of 40 Megahertz (MHz) centered at 70 MHz and has a diffraction efficiency of about 80%. Such an AO cell is generally referred to as a broadband AO cell. Broadband AO cells are designed to maintain the Bragg relationship (see below) over the entire bandwidth of the device. This allows the cell to be simultaneously driven at a plurality of different RF frequencies and provides minimal variation of the diffraction intensity, for example, less than about 10%, across a wide range of possible diffraction angles.

In apparatus 10, AO cell 22 is driven by RF voltages at four different RF frequencies, $f_1$, $f_2$, $f_3$, and $f_4$, within the bandwidth of the AO cell. Each driving frequency deflects a portion of output beam 16 at a particular angle depending on the frequency. The power in each diffracted portion (diffracted beam or secondary beam) is dependent, inter alia, on the power in beam 16 and the magnitude of the driving frequency, i.e., the magnitude of the RF voltage at that driving frequency. The diffraction angle (the Bragg angle) is given by the Bragg relationship:

$$\text{Sin } \theta_{Bn} = \lambda_0 f_n / 2 N_0 V_a \tag{1}$$

where $\theta_{Bn}$ is the Bragg angle for frequency $f_n$, $f_n$ is the driving frequency; $\lambda_0$ is the laser beam wavelength; $N_0$ is the refractive index of the acousto optic cell material at wavelength $\lambda_0$; and $V_a$ is the acoustic velocity in the cell material. In this example, the diffracting material of the cell is germanium (Ge), which is transparent for output wavelengths of the $CO_2$ laser. Those skilled in the art will recognize that other laser wavelengths may require a cell having a different diffracting material.

Acoustic waves propagated in the acousto-optic material of the AO-cell by the driving frequencies generate optical phase gratings (not shown) within the acousto-optic material, through which laser output beam 16 passes. The angular (frequency) resolution of AO cell depends, inter alia, on the size of beam 16 at the AO cell and the driving frequencies. Accordingly, it may be advantageous to be able to adjust the beam size. This may be effected by a telescope or beam expander 24. Alternatively, the driving frequencies can be varied, to increase or decrease the spacing of the phase gratings.

In apparatus 10, driving frequencies for the acousto optic cell are generated by four individual RF oscillators, designated $f_1$, $f_2$, $f_3$, and $f_4$ corresponding to the frequencies that are generated thereby. The RF voltage outputs of oscillators $f_1$, $f_2$, $f_3$, and $f_4$ are amplified by variable gain amplifiers $A_1$, $A_2$, $A_3$, and $A_4$, respectively.

Driving AO cell 22 with four frequencies provides four diffracted beams designated $B_1$, $B_2$, $B_3$, and $B_4$ corresponding to the driving frequencies. An undiffracted portion 16R of beam 16 is absorbed by a beam dump 26. The diffracted beams are directed by turning mirrors 27 and 28 into a folded optical path that is long enough to achieve a desired spatial separation of the beams. Once the beam separation is adequate, the beams can be focused by lenses 30 directly onto a workpiece, or into optical fibers to carry the beams to a location or apparatus in which they will be used. A beamsplitter 32 directs a sample of each beam to an individual detector to provide a measure of power in the beam. The samples are designated $S_1$, $S_2$, $S_3$, and $S_4$ corresponding to beams $B_1$, $B_2$, $B_3$, and $B_4$. Detectors are designated $D_2$, $D_3$, and $D_4$ corresponding to beams $B_1$, $B_2$, $B_3$, and $B_4$.

The detectors and associated circuitry 34 monitor power of each of the diffracted beams. The detector outputs are compared by a processor 36 against four input reference voltage signals provided by processor 36 in response to commands $C_1$, $C_2$, $C_3$, and $C_4$, corresponding to beams $B_1$, $B_2$, $B_3$, and $B_4$. The commands provided to the processor establish the desired amount of optical power in each of the beams. The reference voltage signals are representative of that desired power. Comparison of the reference voltages and the detector outputs provides gain commands $G_1$, $G_2$, $G_3$, and $G_4$ to amplifiers $D_1$, $D_2$, $D_3$, and $D_4$ respectively. The gain commands provide that the amplifiers increase or decrease the power of driving frequencies $f_1$, $f_2$, $f_3$, and $f_4$. There will be, in effect, four control loops designated $L_1$, $L_2$, $L_3$, and $L_4$ corresponding to the four beams $B_1$, $B_2$, $B_3$, and $B_4$, respectively. The amplitude of each of the four beams $B_1$, $B_2$, $B_3$, and $B_4$ can be independently adjusted by varying the gain and accordingly the RF output voltage of amplifiers $A_1$, $A_2$, $A_3$ and $A_4$ respectively.

When the power of one of beams $B_1$, $B_2$, $B_3$, and $B_4$ is changed, absent any other action, power in the other beams will change because all of the beams share a common input (beam 16). This can be defined as a cross coupling between the beams. By way of example, if a voltage at one driving frequency is increased to diffract more light out laser beam 16 into a corresponding secondary beam, then power in the other three beams will be correspondingly reduced. An effect of this is that processor 36, particularly if control loops $L_1$, $L_2$, $L_3$, and $L_4$ all have about the same bandwidth, can attempt to restore power to the other beams, thereby causing power in one or more of the beams to oscillate. One method of avoiding this oscillation is to program controller 36 such that if a change in power in one the beams is requested, processor 36 suspends control of the other beams, thereby avoiding a competition between the beams for available power. This method, of course, will restrict controlled operation of the four beams to applications in which the beams are not required to be simultaneously controlled.

Controlling beams $B_1$, $B_2$, $B_3$, and $B_4$ to compensate for the above-described cross coupling, in a way that will allow the beams to be simultaneously controlled, can be accomplished by cooperatively controlling the power in laser output beam 16. The output power of an RF excited $CO_2$ laser, as exemplified here, can be conveniently controlled by pulse width modulating (PWM) at a constant repetition rate or by pulse repetition frequency (PRF) modulating the input RF power into the discharge at a constant pulse width. Processor 36 can be programmed to keep track of the total power required by all four beams and to command controller 14 via another control loop $L_5$ to raise or lower the power in output beam 16 in response to a requested change in power, in one or more of beams $B_1$, $B_2$, $B_3$, and $B_4$. This will allow the beams to be controlled simultaneously.

It is preferable, even when controlling beams in this way, to guard against a possibility of some damped oscillation of power in the beams before a requested change in power in the beams is eventually stabilized. One method of guarding against such oscillation is to set control loops $L_1$, $L_2$, $L_3$, and $L_4$ to have significantly different bandwidths. To implement this, detectors $D_1$, $D_2$, $D_3$, and $D_4$ preferably have sufficient bandwidth to support the loop having highest bandwidth. This may, however, limit the sensitivity of detectors that can be used.

It should be noted here that while the present invention has been described in terms of providing four beams from an output beam of a CO2 laser, the invention is limited neither to a $CO_2$ laser nor to the number of beams that are provided from a single laser output beam. By way of example, the laser output beam may be provided by a solid-state laser such as an Nd:YAG laser operated either in a pulsed or CW mode. The laser output beam may be divided into more or less than four separate beams.

The present invention is described above in terms of a preferred and other embodiments. The invention, however, is not limited to the embodiments described and depicted herein. Rather the invention is limited only to the claims appended hereto.

What is claimed is:

1. An apparatus comprising:
   a laser providing an output beam;
   an acousto-optic cell arranged to receive said output beam;
   a plurality of RF oscillators, the output of each of which is amplified by a corresponding plurality of variable gain amplifiers, the output of said amplifiers being arranged to drive said acousto-optic cell simultaneously at a corresponding plurality of different RF frequencies thereby causing a portion of said laser output beam to be diffracted by said acousto-optic cell into a corresponding plurality of separate secondary beams propagating at an angle to each other, with the power in each of said secondary beams being monitored via a corresponding plurality of detectors, and the power in each of said secondary beams depending on the magnitude of said RF driving frequencies and the power in said laser output beam; and
   electronic circuitry arranged to vary the power in said laser beam cooperatively with varying the gain of said amplifiers and correspondingly varying the magnitude of said driving frequencies and monitoring of power in said secondary beams for maintaining a predetermined power in each of said secondary beams.

2. The apparatus of claim 1, wherein said laser is a $CO_2$ laser and laser radiation in said output beam has a wavelength between about 9 and 11 micrometers.

3. The apparatus of claim 2, wherein said acousto-optic cell includes a germanium diffracting material.

4. The apparatus of claim 1, wherein said electronic circuitry is further arranged to change said predetermined power in one or more of said secondary beams in response to one or more corresponding commands.

5. The apparatus of claim 1, wherein each of said amplifiers has a different bandwidth.

6. The apparatus of claim 1, wherein there are four oscillators and said acousto-optic cell is driven at four different frequencies, thereby providing four secondary beams.

7. The apparatus of claim 1, further including a beam expander arranged to increase the size of said laser output beam before said laser output beam is received by said acousto-optic cell.

8. An apparatus comprising:
a laser providing an output beam;
an acousto-optic cell arranged to receive said output beam;
a plurality of oscillators, the output of each of which is amplified by a corresponding plurality of amplifiers, the output of said amplifiers being arranged to drive said acousto-optic cell simultaneously at a corresponding plurality of different frequencies thereby causing a portion of said laser output beam to be diffracted by said acousto-optic cell into a corresponding plurality of separate secondary beams, with the power of at least one of said secondary beams being monitored, and with the power in each of said secondary beams depending on the magnitude of the driving frequencies and the power in said laser output beam; and
electronic circuitry arranged to vary the power in said laser beam cooperatively with varying the gain of said amplifiers and correspondingly varying the magnitude of said driving frequencies in order to control the power of the secondary beams.

9. The apparatus of claim 8, wherein the oscillators generate an RF output.

10. The apparatus of claim 9, further including a plurality of detectors for monitoring the power of each of the secondary beams.

11. The apparatus of claim 10, wherein each of said amplifiers has a different bandwidth.

12. The apparatus of claim 10, further including a beam expander arranged to increase the size of said laser output beam before said laser output beam is received by said acousto-optic cell.

13. The apparatus of claim 10, wherein there are four oscillators and said acousto-optic cell is driven at four different frequencies, thereby providing four secondary beams.

14. The apparatus of claim 10, wherein said laser is a $CO_2$ laser and laser radiation in said output beam has a wavelength between about 9 and 11 micrometers.

15. The apparatus of claim 14, wherein said acousto-optic cell includes a germanium diffracting material.

* * * * *